UNITED STATES PATENT OFFICE.

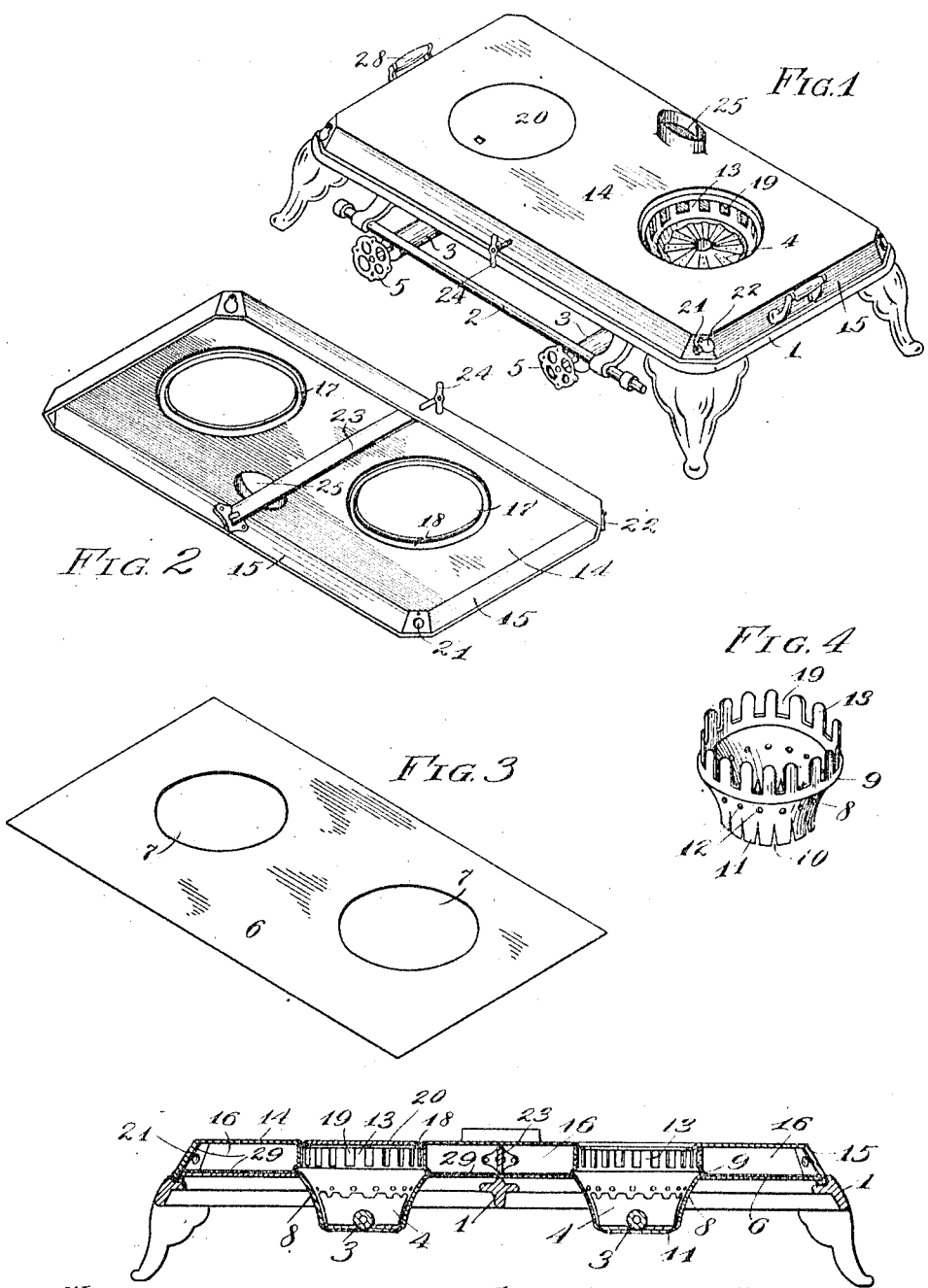

CLARENCE A. NOTMAN, OF ALLIANCE, OHIO.

STOVE.

1,105,683.  Specification of Letters Patent.  Patented Aug. 4, 1914.

Application filed March 18, 1908, Serial No. 421,869. Renewed January 8, 1914. Serial No. 811,096.

*To all whom it may concern:*

Be it known that I, CLARENCE A. NOTMAN, a citizen of the United States, residing at Alliance, in the county of Stark and State of Ohio, have invented a certain new and useful Improvement in Stoves, of which the following is a full, clear, and exact description, reference being had to the accompanying drawings.

This invention relates to stoves, and more particularly to stoves employing liquid, vapor, or gaseous fuel, and it has especial reference to the means for conserving the heat and for distributing the same evenly, or substantially so, over a comparatively large area, whereby a large surface may be heated by one burner and the heat may be applied to a number of utensils at the same time.

Further objects of the present invention are to render the stoves more simple and economical in construction and of greater adaptability to different types of and sizes of burners.

My present invention is an improvement on that shown in my former Patent No. 836,939, dated November 27th, 1906, the specific improvement relating to the sleeves surrounding the burners, and to the means attached to said sleeves for supporting the cooking plate.

In the drawings, forming a part of this application, Figure 1 is a perspective view of a stove containing my invention; Fig. 2 is a perspective view of the flanged cooking plate, looking from the underside and showing also the division damper; Fig. 3 is a perspective view of the bottom or base plate; Fig. 4 is a perspective view showing one of the sleeves or burner casings; Fig. 5 is a central longitudinal section through the stove shown in Fig. 1.

In the ordinary form of stove for burning liquid, vapor, or gaseous fuel, the burners are placed in the upper part of the stove and the flame is unconfined, so that substantially no heat can be obtained therefrom unless the vessel to be heated be placed in direct contact with the flame. In order, therefore, to maintain a number of vessels or other articles in heated condition, it is necessary to use a separate burner for each vessel, which necessarily requires considerable fuel. By my invention, I am enabled to conserve the heat, confining it, if desired, to a part only of the stove, but distributing it over an extended surface of that part, or of the whole stove, so that many vessels may be kept heated even though a single burner may be employed and that burner turned very low. I thus accomplish with a small quantity of fuel a result that has heretofore required a much greater quantity thereof.

Taking up a more specific description of my invention by reference to the accompanying drawings, in which the same reference character designates the same part throughout the several views, 1 represents the stove proper, which may be of any type for burning liquid, vapor, or gaseous fuel. 2 represents the fuel supply pipe, 3 the burner pipes connected with the fuel supply pipe, 4 the burners, and 5 the means for controlling the flow of the fuel to the burners. All the parts thus referred to may be of any of the well known types of construction and need not be more specifically referred to herein.

In the usual type of stoves it is customary to use a top plate having a grid above the burner upon which the vessel or other article to be heated may be placed and which is so constructed that the flame may contact directly with the vessel. In my present invention I remove the grid and substitute for the top plate a sheet metal plate 6, see Fig. 3. This plate has openings 7 therein for the reception of the sleeves or burner casings 8, which are shown in detail in Fig. 4. These burner casings are also of sheet metal construction, being open or tubular and having an enlargement at 9 which rests upon the plate 6 about the edges of the opening 7, whereby the burner casings may be supported. Below this enlargement these casings are gradually constricted, and at their lower edges they are provided with slits 10 forming tongues 11, above which I provide small openings 12 through which air may be admitted to the burners to support combustion. The casings 8 surround the burners 4, as shown in Fig. 5, and the tongues 11 may be bent into contact with the burners so as to hold the parts in their assembled position. These tongues may be bent as may be desired or as may be necessary in order to fit the casing to different types and sizes of burners. Above the enlarged portion 9 of the casings, the latter are provided with a series of upwardly projecting supporting fingers 13, for a purpose hereinafter stated.

The casing 8 may be formed of a single piece of sheet metal as shown, or that part above the enlargement 9 may be formed of a separate piece and attached to the part below the shoulder.

Above the bottom or base plate 6 and preferably parallel therewith is the top or cooking plate 14, shown in perspective in Fig. 2, this cooking plate having a down-turned flange 15 at its outer edge and resting upon the stove about the outer edges of the base plate 6. The base plate, the flanges and the cooking plate thus form a heating chamber 16. This cooking plate is also provided with openings 17 forming vessel apertures, these apertures being located directly above the burners. The supporting fingers 13 of the burner casing project upwardly into contact with the cooking plate around the vessel apertures and thus provide a support for the cooking plate, the latter being bent downwardly about the edges of the vessel apertures so as to form a shoulder 18 which projects within the upper ends of the fingers 13. The spaces 19 between the fingers 13 permit the heated air and the products of combustion to pass outwardly from the casing 8 into the chamber 16. Suitable lids 20 are provided for closing the vessel apertures when desired. At suitable points about the heating chamber 16, as in the flanges 15, I provide vent apertures 21 which are adapted to be closed when desired by dampers 22 which, as shown, are pivoted so as to swing over and close the vent apertures, although the dampers may be otherwise mounted if preferred. With this construction it will be understood that, when a lid 20 or a cooking vessel closes the vessel aperture, the heat from the flame will pass upwardly against the lid or vessel and will then pass outwardly through the spaces 19 into the heating chamber 16. In the beginning this chamber is filled with cold air which is a relatively poor conductor of heat, and, if means were not provided for distributing the heated air within the chamber, those portions of the latter remote from the burner would remain cold or would slowly heat. In order to distribute the heat throughout the chamber, I provide the vent apertures 21, referred to, which apertures permit the colder air to pass outwardly from the chamber and to be replaced by the heated air from the burners. These apertures, therefore, cause an outward draft from the burner, such draft carrying the heat from the burner toward the open apertures so that the cooking plate is heated adjacent thereto. By distributing the vent apertures about the edges of the chamber, a draft may be carried in any desired direction by simply opening the damper adjacent that part which it is desired to heat.

At times it may be necessary to use only a portion of the cooking plate, so that it is unnecessary to heat the entire surface thereof. In order to confine the heat to such portions as it may be desired to employ, I locate within the chamber 16, and journal in the side flanges 15, a division damper 23 having a handle 24 outside the chamber by means of which the damper may be opened or closed as desired. My division damper may be used in a single-burner stove; but achieves its greatest utility in a stove having a plurality of burners, where it may shut off the portion of the chamber corresponding to an unlighted burner. The drawings show a two-burner stove adapted to be divided into equal parts by my damper. In Fig. 5 the damper is shown in its closed position, from which it will be seen that the chamber 16 is substantially closed at its center so that the heated air from one side of the damper cannot pass to the other. It will be understood that when a greater number of burners are employed than is shown in the drawings, a greater number of dampers may likewise be employed so that the heat may be confined to those portions of the cooking plate which immediately surround the burner in use.

In case natural gas is being employed as a fuel, it is desirable that the products of combustion be carried away through a chimney, and for that reason I form in a suitable portion of the cooking plate a pipe opening 25 around which projects a flange, on which the pipe may be placed in the usual manner. In order that the same pipe may answer for both burners shown in the drawings, I locate the opening 25 over the damper 23, although this is not a necessary construction, as a separate opening may be employed for each division of the heating chamber, the pipes from the several openings being united.

The heating chamber may be provided with suitable handles by which it may be lifted off of the stove proper, whenever desired. Such handles are shown at 28, secured to the end flanges 15 of the top plate.

It will be seen that I have provided a very simple and efficient means for utilizing to the best effect the heat of the burners.

The lids which are set in flush with the top plate allow the stove to be used after the manner of a coal stove and may also be removed by a simple lid lifter to allow direct access of the flames whenever desired. The burner sleeve is adapted to be fitted to different sizes and types of burners. It not only conserves the heat, but likewise forms a support for the top plate.

By reason of my division damper and controlled exits from the heating chamber, I am able to control and direct the heat to a nicety. The stove is thus not only very economical of fuel, but is most efficient for all kinds of cooking, whether an intense heat is desired or simply a sufficient temperature to keep articles warm.

The flanged cooking plate may be of any desired shape or design, and may be made of any suitable material. The heat within the chamber 16 may be still further conserved by lining the flanges 15 and the upper side of the base plate 16 with asbestos or similar refractory material, as shown at 29 in Fig. 5.

I claim:

1. In a stove, the combination, with a heating chamber having top and bottom members providing a space between them, of a burner located with its top below the bottom member, there being an opening through such bottom member above the burner, and a sleeve adapted to surround and embrace the side surface of the burner and extending through such opening and into the heating chamber, for the purpose of conducting heat into the chamber, such sleeve having an outward bead or projection adapted to engage such bottom member and hold the sleeve in place, the sleeve extending upwardly above the bead and there provided with lateral openings.

2. In a stove, the combination, with a burner, of a member forming a heating chamber supported above said burner and having a top and bottom spaced apart, said member being provided with an opening in its bottom opposite the burner, a sleeve removably supported in said opening, said sleeve depending below the bottom of the said member and formed with prongs at the lower end thereof adapted to be bent into engagement with the burner, the upper portion of the said sleeve extending into the heating chamber and formed with a series of openings to permit the passage of air from the interior of the sleeve to the interior of the heating chamber.

3. The combination with a stove burner, of an air chamber adapted to surmount the same and including a top plate and a suitable bottom, such top plate and bottom having substantially alined openings adapted to stand over the burner of the stove, and a sleeve adapted to surround the burner and extend through the bottom opening and abut the under side of the top, said sleeve having an outward bead adapted to lie over the bottom plate, whereby it is supported by the bottom plate, the wall of said sleeve having lateral openings between the top plate and said bottom, and the top plate having a depressed annular portion within such sleeve.

In testimony whereof, I hereunto affix my signature in the presence of two witnesses.

CLARENCE A. NOTMAN.

Witnesses:
GARFIELD W. FORDING,
A. S. ARMSTRONG.